United States Patent Office 3,356,657
Patented Dec. 5, 1967

3,356,657
ACCELERATING VULCANIZATION WITH ARYLTHIOMETHYLAMINES
Lloyd A. Walker, Akron, Ohio, assignor to Monsanto Company, St. Louis, Mo., a corporation of Delaware
No Drawing. Filed July 2, 1964, Ser. No. 380,034
10 Claims. (Cl. 260—79.5)

The present invention relates to accelerating the vulcanization of sulfur-vulcanizable diene natural and synthetic rubbers. More particularly, it relates to accelerating vulcanization with arylthiomethylamines.

It is an object of the present invention to accelerate the vulcanization of sulfur-vulcanizable diene rubber whether natural or synthetic. A further object is to provide accelerators useful at higher temperatures than heretofore feasible. A still further object is to provide vulcanizable natural and synthetic rubber compositions having desirable processing safety. Other objects will be apparent from the detailed description following.

The use in the rubber industry of mixers operating at high temperatures and the introduction of carbon blacks lacking the inherent processing safety of channel blacks have imposed progressively more exacting requirements for accelerators. It has now been found that certain arylthiomethylamines possess the properties desired to an outstanding degree. These accelerators may be represented by the general formula

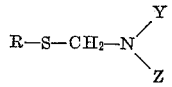

where R is an aryl radical of the benzene and naphthalene series, either hydrocarbon or hydrocarbon substituted by one or more, preferably not more than two, amino, alkoxy, halo or nitro substituents, Y is hydrogen or lower alkyl, Z is lower alkyl, phenyl, halophenyl or nitrophenyl or Y and Z together with the adjacent nitrogen atom form a heterocyclic radical, as, for example, pyrrolidinyl, morpholino, piperidino or hexamethylenimino. R in the above formula is preferably phenyl but may be xylyl, tolyl or other alkyl phenyl preferably containing 1–12 carbon atoms in the alkyl chain or naphthyl. The methylene radical connecting the sulfur and nitrogen is necessary for the strong accelerating properties hereinafter described. Comparable properties were not observed upon farther separation of the sulfur and nitrogen.

The compounds used according to the invention can be prepared from condensation of thiophenols with secondary amines and formaldehyde by known procedures. Examples of typical compounds are set out below:

N-(phenylthiomethyl)dimethylamine
N-(p-chlorophenylthiomethyl)dimethylamine
N-(phenylthiomethyl)diethylamine
N-(p-methoxyphenylthiomethyl)dimethylamine
N-(p-methoxyphenylthiomethyl)diethylamine
N-(phenylthiomethyl)dibutylamine
N-methyl-N-(phenylthiomethyl)aniline
N-ethyl-N-(phenylthiomethyl)-o-chloroaniline
N-(2,4-dinitrophenylthiomethyl)diethylamine
N-(2,4-dinitrophenylthiomethyl)dimethylamine
N-(2-methylphenylthiomethyl)aniline
N-(ar,ar-xylylthiomethyl)aniline
3,4-dichloro-N-(diphenylthiomethyl)aniline
m-Nitro N-(phenylthiomethyl)aniline
N-(phenylthiomethyl)-p-nitroaniline
N-(o-aminophenylthiomethyl)dimethylamine
N-(o-aminophenylthiomethyl)diethylamine
N-(phenylthiomethyl)aniline
N-(p-tert. butylphenylthiomethyl)dimethylamine
N-(p-tert. butylphenylthiomethyl)diethylamine
N-(p-methoxyphenylthiomethyl)dibutylamine
N-(p-tert. butylphenylthiomethyl)diisopropylamine
N-[p-(1,1-dimethylbutyl)phenylthiomethyl]dipropylamine
N-(2,4-dinitrophenylthiomethyl)diisopropylamine
N-(p-tert. butylphenylthiomethyl)dipropylamine
N-[p-(1,1-dimethylbutyl)phenylthiomethyl]diethylamine
N-[p-(1,1-dimethylbutyl)phenylthiomethyl]dimethylamine
N-[p-(1,1,3,3-tetramethylbutyl)phenylthiomethyl]diethylamine
N-[p-(1,1,3,3-tetramethylbutyl)phenylthiomethyl]dimethylamine
N-[p-(1,1,3,3-tetramethylbutyl)phenylthiomethyl]dipropylamine
N-[p-(1,1,3,3-tetramethylbutyl)phenylthiomethyl]diisopropylamine
4-(p-tert. butylphenylthiomethyl)morpholine
4-[p-(1,1-dimethylbutyl)phenylthiomethyl]morpholine
N-[p-(1,1,3,3-tetramethylbutyl)phenylthiomethyl]aniline
N-[p-(1,1-dimethylbutyl)phenylthiomethyl]aniline
N-[p-(1,1,3,3-tetramethylbutyl)phenylthiomethyl]morpholine
N-(p-nonylphenylthiomethyl)diethylamine
N-(p-nonylphenylthiomethyl)diisopropylamine
N-(p-nonylphenylthiomethyl)dimethylamine
N-(β-naphthylthiomethyl)diethylamine
N-(ar-tolylthiomethyl)dimethylamine
N-(ar-tolylthiomethyl)diethylamine
N-(p-chlorophenylthiomethyl)morpholine
N-(p-ethoxyphenylthiomethyl)-p-nitroaniline
N-(p-ethoxyphenylthiomethyl)hexamethylenimine
N-(phenylthiomethyl)hexamethylenimine
N-(p-bromophenylthiomethyl)diethylamine To demonstrate the effectiveness of the herein described vulcanization accelerators, a base stock was compounded comprising:

Base stock:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Antioxidant | 1.5 |
| Sulfur | 2.5 |

To the above base stock was added in separate stocks 0.5 part by weight of accelerator as indicated below:

Stock:
A____N-methyl-N-(phenylthiomethyl)aniline
B____N-ethyl-N-(phenylthiomethyl)-o-chloroaniline.
C____m-Nitro N-(phenylthiomethyl)aniline.
D____N-(phenylthiomethyl)-p-nitroaniline.
E____N-(p-chlorophenylthiomethyl)diethylamine.
F____N-(p-chlorophenylthiomethyl)dibutylamine.

The stocks were cured in the usual manner by heating in a press for different periods of time at 144° C. The modulus and tensile properties of the 60-minute cures and resistance of the unvulcanized compositions to scorch are set forth below. In these tests the "Mooney Scorch" was the time in minutes required for the Mooney plasticity at 135° C. to rise 10 points above the minimum value.

TABLE I

| Stock | Modulus of Elasticity in lbs./in.² at Elongation of 300% | Tensile at Break in lbs./in.² | Mooney Scorch |
|---|---|---|---|
| A | 1,300 | 2,800 | 12.4 |
| B | 1,250 | 2,790 | 12.6 |
| C | 1,440 | 2,720 | 15.3 |
| D | 1,270 | 2,590 | 20.5 |
| E | 2,000 | 3,700 | 10.5 |
| F | 1,920 | 3,530 | 11.2 |

The compounds of this invention were particularly advantageous when curing temperatures of 160° C. were used. Less reversion occurred than with commercial sulfenamide accelerators while good scorch and physical properties were obtained. As illustrative of this embodiment of the invention, a base stock was compounded comprising

|   | Parts by weight |
|---|---|
| Smoked sheets rubber | 100.0 |
| Carbon black (high abrasion furnace) | 50.0 |
| Zinc Oxide | 3.0 |
| Stearic acid | 2.0 |
| Hydrocarbon processing oil | 3.0 |
| Antioxidant | 2.0 |

To this base stock were added in separate stocks 2.0 parts by weight of sulfur and 0.35 part by weight of accelerator as indicated below:

Stock:
G ____ N-(phenylthiomethyl)dibutylamine.
H ____ N(p-ethoxyphenylthiomethyl)-p-nitroaniline.
J ____ N-(p-ethoxyphenylthiomethyl)hexamethylenimine.
K ____ N-(phenylthiomethyl)hexamethylenimine.
L ____ N-(p-chlorophenylthiomethyl)morpholine.

The stocks were cured in the usual manner by heating in a press for different periods of time at 160° C. The modulus and tensile properties of the 15 and 40 minute cures and the time required for the Mooney plasticity at 135° C. to rise 50 points above the minimum value are set forth in Table II.

TABLE II

| Stock | Modulus of Elasticity in lbs./in.² at Elongation of 300% | | Tensile at Break in lbs./in.² | | Mooney Scorch |
|---|---|---|---|---|---|
|  | 15 Min. | 40 Min. | 15 Min. | 40 Min. |  |
| G | 1,350 | 1,440 | 2,500 | 2,300 | 13.5 |
| H | 1,140 | 1,200 | 2,100 | 2,200 | 17.4 |
| J | 1,520 | 1,490 | 2,800 | 2,400 | 12.7 |
| K | 1,590 | 1,410 | 2,900 | 2,700 | 11.3 |
| L | 1,390 | 1,370 | 2,700 | 2,100 | 13.6 |

The modulus of a stock cured with a commercial sulfenamide accelerator was 30% less after 40 minutes than after 15 minutes. Additional tests were carried out at 160° C. varying the amount of accelerator and sulfur. The ingredients added to the base stock are indicated below:

TABLE III

| Stock | Sulfur |   |
|---|---|---|
| M | 2.0 | 0.5 N-(p-ethoxyphenylthiomethyl)hexamethylenimine. |
| N | 2.0 | 0.5 N-(phenylthiomethyl)hexamethylenimine. |
| O | 2.5 | 0.5 N-(p-ethoxyphenylthiomethyl)hexamethylenimine. |
| P | 2.5 | 0.5 N-(phenylthiomethyl)hexamethylenimine. |

After curing 20 and 30 minutes respectively at 160° C. the following modulus and tensile properties were obtained.

TABLE IV

| Stock | Modulus of Elasticity in lbs./in.² at Elongation of 300% | | Tensile at Break in lbs./in.² | |
|---|---|---|---|---|
|  | 20 Min. | 30 Min. | 20 Min. | 30 Min. |
| M | 1,750 | 1,840 | 3,000 | 2,800 |
| N | 1,980 | 1,900 | 3,100 | 2,900 |
| O | 2,190 | 2,030 | 3,500 | 3,300 |
| P | 2,190 | 2,030 | 3,600 | 3,200 |

It is obvious from the foregoing that the arylthiomethylamines of this invention exhibit accelerating properties at normal curing temperature and particularly at higher curing temperature. Smaller amounts of the accelerators may be employed than those indicated in the examples. Amounts as small as 0.1% by weight on the rubber as well as amounts up to 5.0% by weight on the rubber may be employed depending upon the nature of the rubber and the other compounding ingredients.

Although the invention has been illustrated by numerous specific embodiments, it is not limited thereto. The principles described may be employed to advantage for compounding other types of sulfur-vulcanizable diene rubbers. These rubbers contain a diene hydrocarbon in the polymer structure which contributes unsaturation and sulfur vulcanizability. They include synthetic polyisoprene, polymers of butadiene-1,3 and copolymers of butadiene-1,3 with vinyl monomers copolymerizable therewith, such as styrene and acrylonitrile.

It is intended to cover all changes and modifications of the examples of the invention herein chosen for purposes of disclosure which do not constitute departures from the spirit and scope of the invention.

What is claimed is:

1. The process of vulcanizing a sulfur-vulcanizable diene rubber which comprises heating the rubber and sulfur in the presence of an accelerating amount of a compound of the structure

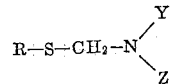

where R is a member of the group consisting of aryl hydrocarbon of the benzene and naphthalene series, nuclear substituted derivatives thereof containing at least one but not more than two substituents selected from the group consisting of amino, lower alkoxy, nitro and halo, Y is selected from the group consisting of hydrogen and lower alkyl and radicals which with Z and N constitute a heteracyclic radical selected from the group consisting of morpholino and

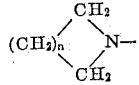

where $n$ is 2 to 4 inclusive and Z is eslected from the group consisting of lower alkyl, phenyl, halophenyl and nitrophenyl and radicals which with Y and N constitute a heterocyclic radical as defined.

2. The process of vulcanibazle diene rubber which comprises heating the rubber and sulfur in the presence of an accelerating amount of a compound of the structure

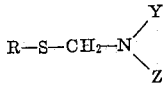

where R is an aryl hydrocarbon of the benzene series, and Y and Z are lower alkyl.

3. The process of vulcanizing a sulfur-vulcanizable diene rubber which comprises heating the rubber and sulfur in the presence of an accelerating amount of a compound of the structure

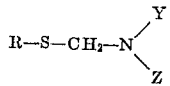

where R is an aryl hydrocarbon of the benzene series, Y is hydrogen and Z is phenyl.

4. The process of vulcanizing a sulfur-vulcanizable diene rubber which comprises heating the rubber and sulfur in the presence of an accelerating amount of a compound of the structure

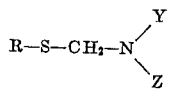

where R is an aryl hydrocarbon of the benzene series, Y is lower alkyl and Z is phenyl.

5. The process of vulcanizing a sulfur-vulcanizable diene rubber which comprises heating the rubber and sulfur in the presence of an accelerating amount of a compound of the structure

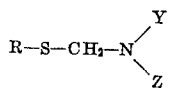

where R is an aryl hydrocarbon of the benzene series, Y is lower alkyl and Z is halophenyl.

6. The process of vulcanizing a sulfur-vulcanizable diene rubber which comprises heating the rubber and sulfur in the presence of an accelerating amount of a compound of the structure

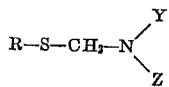

where R is lower alkoxyphenyl, Y is hydrogen and Z is nitrophenyl.

7. The process of vulcanizing a sulfur-vulcanizable diene rubber which comprises heating the rubber and sulfur in the presence of an accelerating amount of a compound of the structure

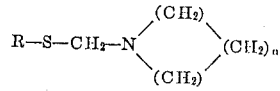

where R is an aryl hydrocarbon of the benzene series and $n$ is an integer at least two but less than five.

8. The process of vulcanizing a sulfur-vulcanizable diene rubber which comprises heating the rubber and sulfur in the presence of an accelerating amount of a compound of the structure

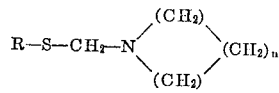

where R is lower alkoxyphenyl and $n$ is an integer at least two but less than five.

9. The process of vulcanizing a sulfur-vulcanizable diene rubber which comprises heating the rubber and sulfur in the presence of an accelerating amount of a compound of the structure

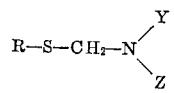

where R is is p-alkylphenyl, and Y and Z are lower alkyl.

10. The process of vulcanizing a sulfur-vulcanizable diene rubber which comprises heating the rubber and sulfur in the presence of an accelerating amount of a compound of the structure

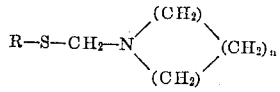

where R is p-alkylphenyl and $n$ is an integer at least two but less than five.

References Cited

UNITED STATES PATENTS 3,047,546    7/1962    Lober et al. _____ 260—79.5

JOSEPH L. SCHOFER, *Primary Examiner.*

D. K. DENENBERG, *Assistant Examiner.*